(12) United States Patent
Eilers (10) Patent No.: US 8,304,700 B1
(45) Date of Patent: Nov. 6, 2012

(54) HEATER WARMING RACK

(76) Inventor: Weston A. Eilers, Coon Rapids, MN (US)

( * ) Notice: Subject to any disclaimer, the term of this patent is extended or adjusted under 35 U.S.C. 154(b) by 427 days.

(21) Appl. No.: 12/688,789

(22) Filed: Jan. 15, 2010

(51) Int. Cl.
*H05B 3/06* (2006.01)
(52) U.S. Cl. ............ 219/521; 219/454.11; 392/347
(58) Field of Classification Search ............ 219/454.11, 219/521; 392/455, 461, 313, 306, 339, 347–385; 99/340, 318, 371, 377, 390–420
See application file for complete search history.

(56) References Cited

U.S. PATENT DOCUMENTS

| | | | |
|---|---|---|---|
| 1,807,363 A * | 5/1931 | Wheatcroft | 108/28 |
| 1,999,515 A | 4/1935 | Muenzer | |
| 2,332,117 A | 10/1943 | Shepherd | |
| 2,376,640 A | 5/1945 | Wall et al. | |
| 2,422,450 A | 6/1947 | Van Daam | |
| 2,597,127 A | 5/1952 | Rahr | |
| 3,051,075 A * | 8/1962 | Watts | 99/397 |
| 3,067,737 A | 12/1962 | Brown | |
| 3,085,350 A | 4/1963 | Waters | |
| 3,139,879 A | 7/1964 | Bauer et al. | |
| 3,199,504 A | 8/1965 | Morin, Jr. et al. | |
| 3,280,813 A | 10/1966 | Schaenzer | |
| 3,326,265 A | 6/1967 | Paulin | |
| 3,358,585 A * | 12/1967 | Scherer | 99/340 |
| 3,416,510 A | 12/1968 | Paulson | |
| 3,513,822 A | 5/1970 | Korngold | |
| 3,547,097 A | 12/1970 | Rice et al. | |
| 3,935,809 A | 2/1976 | Bauer | |
| 5,775,209 A * | 7/1998 | Tiemann | 99/426 |
| 6,124,578 A * | 9/2000 | Elliot | 219/528 |
| 6,131,560 A * | 10/2000 | Healy | 126/30 |
| 6,196,116 B1 * | 3/2001 | O'Grady et al. | 99/340 |
| 6,201,217 B1 * | 3/2001 | Moon et al. | 219/386 |
| 6,523,461 B1 * | 2/2003 | Johnston et al. | 99/340 |
| 6,945,245 B1 | 9/2005 | Wilson | |
| 7,013,080 B1 * | 3/2006 | Kaplanis et al. | 392/422 |
| 7,445,004 B1 | 11/2008 | Milner et al. | |
| 8,053,709 B2 * | 11/2011 | Vandrak et al. | 219/533 |
| 2007/0269758 A1 | 11/2007 | Hofbauer et al. | |

* cited by examiner

*Primary Examiner* — Cuong Q Nguyen
*Assistant Examiner* — Yosef Gebreyesus
(74) *Attorney, Agent, or Firm* — Albert W. Watkins (57) ABSTRACT

A portable space heater is combined with a compact and collapsible rack that may be folded, stored and transported adjacent with, in the outline of, and supported by the portable space heater. The rack may be removed from the storage position, unfolded, and coupled to a protective grid found on the face of the portable space heater. The rack positively engages with this grid using bifurcated legs that swivel about a main support surface. The bifurcated legs intertwine with the protective grid in such a way as to prevent the rack from collapsing, even when impacted with substantial force. The main support surface of the rack is vertically displaced from the space heater heating element, so that food or beverage is much less likely to contaminate the heating element.

11 Claims, 6 Drawing Sheets

HEATER WARMING RACK

BACKGROUND OF THE INVENTION

1. Field of the Invention

The present invention relates generally to stoves and furnaces, and more particularly to portable heating apparatus that include in combination knockdown and separable cooking and warming racks.

2. Description of the Related Art

Humans have several basic needs, including food, water, and a suitable environment. All three of those basic needs become much more difficult to find during winter months in areas outside of the tropics. With that in mind, humanity has found and created various forms of radiant heat, fueled by gas, electricity, wood, coal, and other sources of energy. The radiant heat has been used to warm a living space, food, water and for many other purposes.

Apparatus for producing heat include but are not limited to fires, furnaces, heaters, radiators, stoves, microwaves, ovens, grills, and the like. Many of the structures are large and bulky, and require large amounts of set-up. While this is of less concern with permanent structures such as a residence or home, such apparatus are poorly suited for temporary use and outdoor activities such as ice fishing or camping that would require transporting and setting up the heat apparatus. In such instances, it is far more desirable to have a relatively compact and readily transportable apparatus, such as a camp stove, space heater, recreational fireplace, and the like. Countless examples of such apparatus are found in the prior art.

Since fishermen, campers and other outdoor enthusiasts have to transport gear to and from each temporary location where they will spend time, the size, weight, and number of functions that a single apparatus can reliably perform are each very important. As a result, and whenever possible, any gear or apparatus will desirably serve as many purposes as possible, to decrease the amount of gear necessary to be transported.

One way this may be achieved is by using a heat source such as a campfire or portable heater to also warm or cook food or water. Common apparatus suspend food or a cooking mechanism over or adjacent to a heat source. For less portable devices, pots and pans have been suspended on burners, racks, grills, and the like. One method of cooking has involved using racks or girds over a heat source, such as a stove or in an oven. For example, U.S. Pat. No. 6,945,245 to Wilson, entitled "Trivet Oven Rack", discloses an oven rack which is self-supporting on the bottom of an oven. Similarly, U.S. Pat. No. 2,376,640 to Wall et al, entitled "Combined Oven Tray and Cooking Rack", discloses a tray for use in an oven. The Wall et al tray has a cooking rack incorporated with it, allowing for cooking on the rack while catching any drippings. The cooking rack has the additional feature of an adjustable portion which forms a "V" shape ideal for roasting a chicken. Though ideal for use in combination with a fixed stove or oven, these apparatus have not been designed to operate with a more lightweight and portable heat source.

For more portable cooking, a different design of rack is necessary. One such example is U.S. Pat. No. 3,416,510 to Paulson, entitled "Camp Stove Toaster". The camp stove toaster disclosed is a rack which supports a piece of bread for toasting suspended over a cylindrical member which directs the heat from a camp stove to toast the bread. Similarly, U.S. Pat. No. 7,445,004 to Milner et al., entitled "Campfire Grill Assembly", is a grill designed for use in combination with a campfire. Another approach to campfire cooking is seen in U.S. Pat. No. 3,067,737 to Brown, entitled "Reflector Oven", which discloses a rack for cooking next to a campfire, which has radiant heat focused onto it by reflector panels. U.S. Pat. No. 1,999,515 to Muenzer, entitled "Camp Stove", also discloses a cooking device for combination with a campfire. This device uses the fire as the heat source for a combination stove and garbage disposal system, with grill racks along the top and a portion adjacent to the fire ideal for warming food or baking food, such as potatoes. Another rack is illustrated in U.S. Pat. No. 2,597,127 to Rahr, entitled "Toaster". Rahr's toaster focuses heat through a series of slits toward racks, which are angled inward. Such racks hold pieces of bread and provide for even toasting of several pieces of bread at once. While all are effective, they are not ideal in all environments and surroundings. Campfires do not work when there is a higher risk of fire spreading, when there is a potential for there not being available firewood or that the firewood is wet, when in an enclosed shelter, or in other instances.

Other devices have been designed with the intention of making portable heating apparatus dual purpose. One exemplary approach to creating a dual-purpose radiant heat and cooking apparatus is found in U.S. Pat. No. 3,280,813 to Schaenzer, entitled "Space Heater Converter for Cooking Stove", which illustrates a cover for a typical camp stove. The cover has a "multiplicity of small, spaced apertures or perforations which are designed to disperse the heat of the stove laterally outwardly and more or less uniformly throughout a room, in contrast to the straight-upwardly path followed by the heat normally emitted by the stove." In other words, the cover converts a typical camp stove into a space heater. While functional, the camp stove can only be used in one function at a time, making it less convenient and less efficient.

A similar concept is found in a combination space heater and grill. U.S. Pat. No. 2,422,450 to Van Daam, entitled "Combined Space Heater and Grill" discloses an electric heater which heats air drawn in through an inlet on the bottom and expels the warm air out a vent along the top edge. The directionality of the vent causes the warm air to move outward across a space in such a manner as to warm an entire room. The heater additionally has a door along the front side which, when opened, pulls the heating element into a horizontal position which allows for its use as a grill. Such an embodiment poses the distinct problem that any food drippings land on the heating element. During later use as a space heater, the odor of the further cooking or burning of the drippings would spread throughout the space being heated. Additionally, such a design limits the structure to one function at a time, decreasing the usefulness of the apparatus.

Additional combination grilling apparatuses and space heaters are illustrated in the patents. One such apparatus is found in U.S. Pat. No. 3,935,809 to Bauer, entitled "Grilling Apparatus Usable as a Space Heating Means". Bauer's patent discloses "a grilling apparatus with a heating arrangement . . . [which] has a vertically a vertically arranged heating plane." With the grill closed, the vertically arranged heating plane warms the entire interior, allowing for cooking food. However, with the grill hood open and the front wall swung open, the vertically arranged heating plane projects the heat towards the space in front of the grill, much like a traditional space heater. Another example is seen in U.S. Pat. No. 3,547, 097 to Rice et al., entitled "Gas Infra-Red Burner Construction". The burner construction has "ceramic plate material on one face . . . [with] a large number of small perforations throughout its thickness." The ceramic plate is heated by a fuel-air mixture which moves through the perforations and burns at the surface of the plate. The heat from the ceramic plate emanates as infrared radiation, allowing for heating the air or grilling food, depending upon the angle at which the burner structure is angled. Unfortunately, both such structures are similarly only functional in one capacity at a time and lack true compact portability. In addition, while the drippings do not land on the heating elements, the grill portion is necessarily combined in the same space as the heater, posing a similar issue with odors at later points in time.

Some have designed heaters with exterior racks for cooking. For example, U.S. Pat. No. 3,139,879 to Bauer et al., entitled "Gas Burning Heaters", illustrates a design similar to a camp stove which emits radiant energy and can be oriented to provide a rack across the top for supporting the object to be heated or cooked. Similarly, U.S. Pat. No. 3,326,265 to Paulin, entitled "Radiant Heating Means", provides a heating design with a grill structure across the top. Paulin's radiant heating device has rotating braces which can be used to suspend the heating device, brace it at such an angle as to send the heat upward and outward throughout a space, or place the grid facing upward as necessary for cooking. This ideal structure would be difficult to adjust during use due to the temperature of the surfaces, making it difficult to transition from using it suspended or braced at an angle to using it for cooking.

Portable heaters with more focused heat which could be used for cooking are also illustrated in the prior art, including U.S. published patent application 2007/0269758 to Hofbauer et al., entitled "Radiant Burner"; and U.S. Pat. No. 3,513,822 to Korngold, entitled "Space Heaters".

Heaters with racks that rotate into place are also illustrated in the prior art. U.S. Pat. No. 3,085,350 to Waters, entitled "Portable Heater", works with a portable heater and a rack structure, which allows for heating objects which can be draped over the bars, such as socks for warming or drying. U.S. Pat. No. 3,199,504 to Morin, Jr. et al, entitled "Dual Purpose Space Heater", illustrates a wall-mounted space heater with a tray that flips open, allowing for a stand or tray to be placed directly under a heat vent, allowing for the warming of food or beverage. Unfortunately, the device is not transportable, limiting its application in outdoor activities.

U.S. Pat. No. 2,332,117 by Shepherd, entitled "Cooking grid or shelf", is exemplary of racks that have been designed to be suspended from pans or other cooking utensils.

Each of the patents referenced herein above is expressly incorporated herein by reference for the teachings that they individually and collectively provide relevant to the present invention. Webster's New Universal Unabridged Dictionary, Second Edition copyright 1983, is also incorporated herein by reference in entirety for the definitions of words and terms used herein.

SUMMARY OF THE INVENTION

In a first manifestation, the invention is, in combination, a portable space heater and a compact and collapsible rack. The combination heater and rack has a first operative position providing a support surface on said rack for warming and heating articles placed thereon, and a second stowed position for transport. The portable space heater comprises a body, a heating element supported within the body, and a protective grid shielding the heating element from accidental contact. The protective grid defines a first surface and a second surface, with the first surface relatively more adjacent to the heating element than the second surface, and the second surface of the protective grid relatively more distal to the heating element than the first surface of the protective grid. The rack comprises a main support surface and a leg assembly coupled with and moveable relative to the main support surface. The leg assembly has at least one leg member. In the second stowed position, the leg assembly is folded adjacent to the main support surface, and in the first operative position extends generally perpendicular thereto. A bifurcation on the leg member is located distal to the main support surface. The rack in first operative position is coupled to the protective grid, with the main support surface suspended and engaging therewith. The leg member, at a transition location intermediate the bifurcation and main support surface, passes through the protective grid. The bifurcation is also coupled to the protective grid, and has a first bifurcation member extensive on the first surface of the protective grid and a second bifurcation member extensive on the second surface of the protective grid, the first and second bifurcations capturing the protective grid therebetween.

In a second manifestation, the invention is a method of stowing, transporting, and assembling a rack with a portable space heater.

OBJECTS OF THE INVENTION

Exemplary embodiments of the present invention solve inadequacies of the prior art by providing a compact and collapsible rack that may be folded, stored and transported adjacent with, in the outline of, and supported by a portable space heater. When at a location where food warming or cooking is desired, the rack may be removed from the storage position, unfolded, and coupled to a wire grid found on the face of the portable space heater. The wire grid is commonplace in the art of portable heaters, and serves to protect against accidental contact with the heating element. The rack positively engages with this wire grid in such a way as to prevent the rack from collapsing, even when impacted with substantial force. As a result, the rack will safely support food or beverage. Owing to the placement, food or beverage is much less likely to contaminate the heating element.

A first object of the invention is to expand the utility of portable heaters having protective grids to facilitate warming or cooking foods and beverages. A second object of the invention is to provide this expanded utility with a relatively low cost rack. Another object of the present invention is to maintain the safety features of the portable heater and avoid contamination of the heating element. A further object of the invention is the provision of a rack that will couple with many diverse protective grids, allowing the rack to couple with different models and sizes of heaters without requiring change. Yet another object of the present invention is to facilitate the stowing and transport of the rack within the confines and preferably outline of the portable heater. An additional object of the invention is the provision of a rack geometry which is simple in construction, and also simple and apparent in the coupling to portable heaters.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
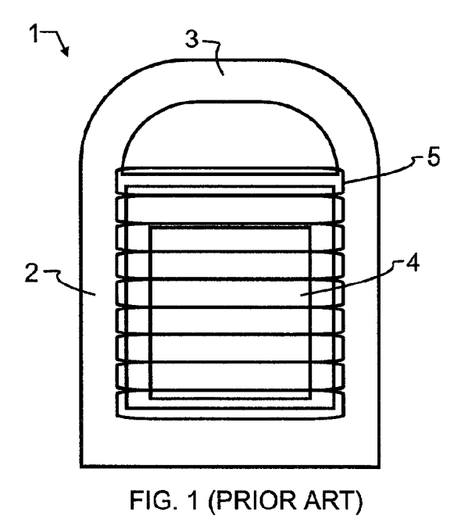
FIGS. 1-3 illustrate an exemplary prior art portable gas heater suitable for use in the present invention from front side and back views, respectively.
Figure 2:
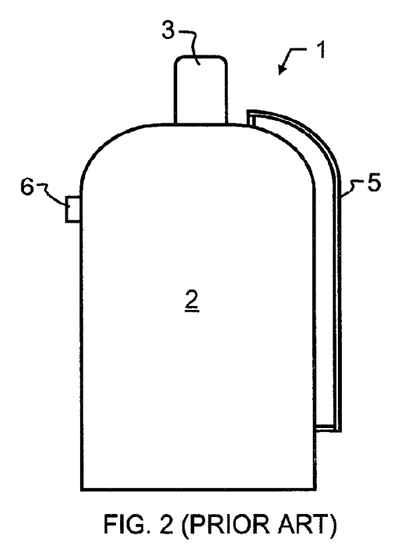
Figure 3:
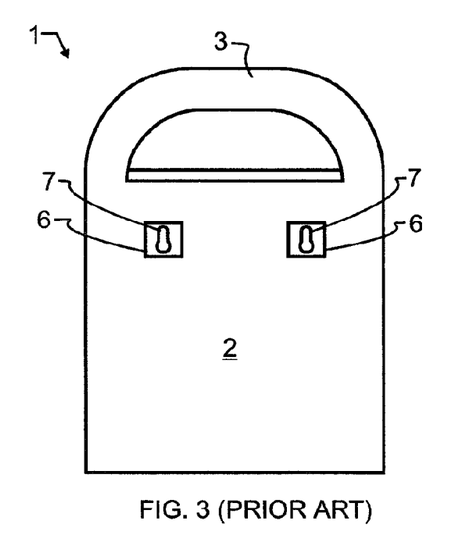

Manifested in the preferred embodiment, the present invention provides a warming rack 10 for use in combination with a prior art portable gas heater 1, such as may typically be used by outdoors enthusiasts. The specific style of space heater 1 may vary, though the most preferred prior art portable gas heater 1 is illustrated in FIGS. 1-3. Portable gas heater 1 has an upright body 2 which is readily transported by grasping handle 3, found along the top edge of body 2, and lifting. In the most preferred embodiment, portable gas heater 1 is an upright device, with heater 4 centrally located in the body 2 of the gas heater 1. As can be seen, heater 4 releases warm air and radiates heat out of the portable gas heater 1 through the side of the upright body, with a protective grid 5 preventing contact with and burns from heater 4. Protective grid 5 further prevents accidental damage to heater 4, and greatly reduces the risk of catastrophic fire.

For storage purposes or for improved heating in a specific loci, the portable gas heater body 2 also has raised, hollow securing tabs 6 with a cut-out 7 sized to allow a screw, nail, hook, or other protruding fastener to be inserted. Most preferably, cut-out 7 is larger at the bottom, allowing for a fastener with a larger head to be inserted and secured below the head by the smaller design of the top portion of the cut-out 7.

Figure 4:
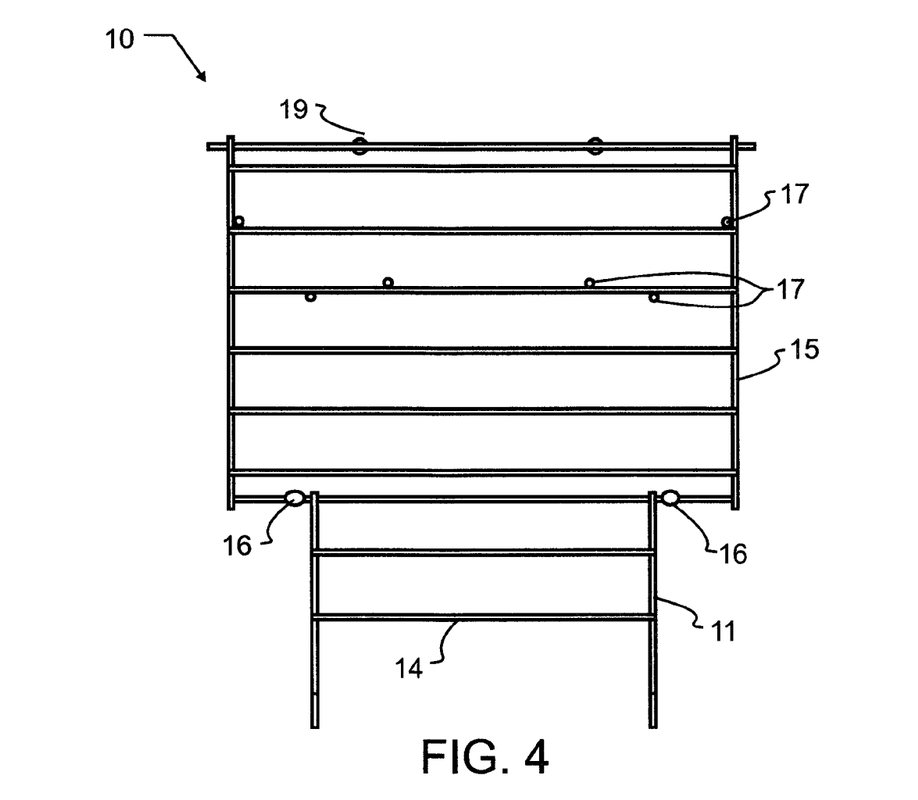
FIGS. 4 and 5 illustrate a first preferred embodiment rack designed in accord with the teachings of the present invention from top and side views, respectively.
Figure 5:
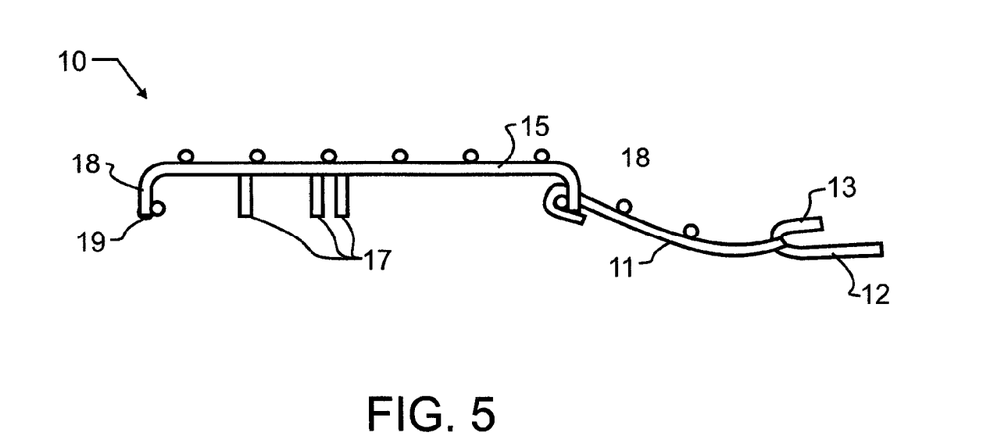

FIGS. 4 and 5 illustrate a preferred embodiment rack 10, separated from portable space heater 1, and laid flat for illustrative purposes. Rack 10 has two main members, main support surface 15 and a leg assembly having individual legs 11 and cross-members 14. These two members are pivotally coupled together, allowing the leg assembly to rotate relative to main support surface 15. While main support surface 15 and the leg assembly are each illustrated herein as a wire rack forming a generally rectangular grid, for the purposes of the present invention this will be understood to be merely illustrative. Any suitable materials may be used in the fabrication thereof, and the selection thereof may substantially alter the visual appearance. Exemplary constructions, though not limiting only thereto, include expanded metal, sheet stock that may be solid or perforated, wire rack as illustrated, and any other suitable constructions that will be apparent to those of skill in this art upon a reading of the present disclosure. Wire has been illustrated for preferred embodiment rack 10, owing to the combination of low weight, low cost, ease of fabrication, visual appearance, and ready passage of heat. However, other materials and techniques may be used and are encompassed by the present invention.

Since individual legs 11 are separated by less than the width of main support surface 15, stops 16 may be provided to keep legs 11 located properly relative thereto. These stops 16 may simply be enlarged regions, or may be any other suitable structure or hardware which will prevent legs 11 from moving beyond the stops.

Main support surface 15 may optionally be provided with vertical extensions 18 that, in this preferred embodiment rack 15, are simply folds in the body of the wire rack that extend out of the plane defined generally by main support surface 15. Optional protrusions 19 may also be provided, which facilitate even resting and stabilize rack 10 by providing two spaced points of contact with heater 1. In the event that heater 10 is rounded, a straight rack will only contact at one point, and will seem wobbly. These protrusions will ensure two spaced points, and will not wobble so much.

Most preferably, vertical extensions 18 will engage with heater 1, and more specifically or additionally may engage with protective grid 5. In the case that vertical extensions 18 do engage with heater 1, additional support and stabilization is provided to rack 10 by pins 17, which are positioned in such a manner as to engage with the protective grid 5. However, there are many different styles of portable heaters, and in some instances vertical extensions 18 of the preferred embodiment rack 10 might not couple with such a heater. In such instances, pins 17 are the main method of coupling. Consequently, any number of pins 17 may be used along cross-members 14 and the main support surface 15 in a pattern desirable for to couple with a wide array of portable space heaters.

Main support surface 15 in the preferred embodiment runs parallel to the earth, pivoting at legs 11. The pivot of legs 11 allows legs 11 to swing down toward protective grid 5 for engagement therewith. Bifurcated legs 11 are unfolded and coupled to protective grid 5 by intertwining the bifurcation members 12, 13 with protective grid 5 in such a way as to prevent the rack 10 from collapsing, even when impacted with substantial force.

Figure 6:
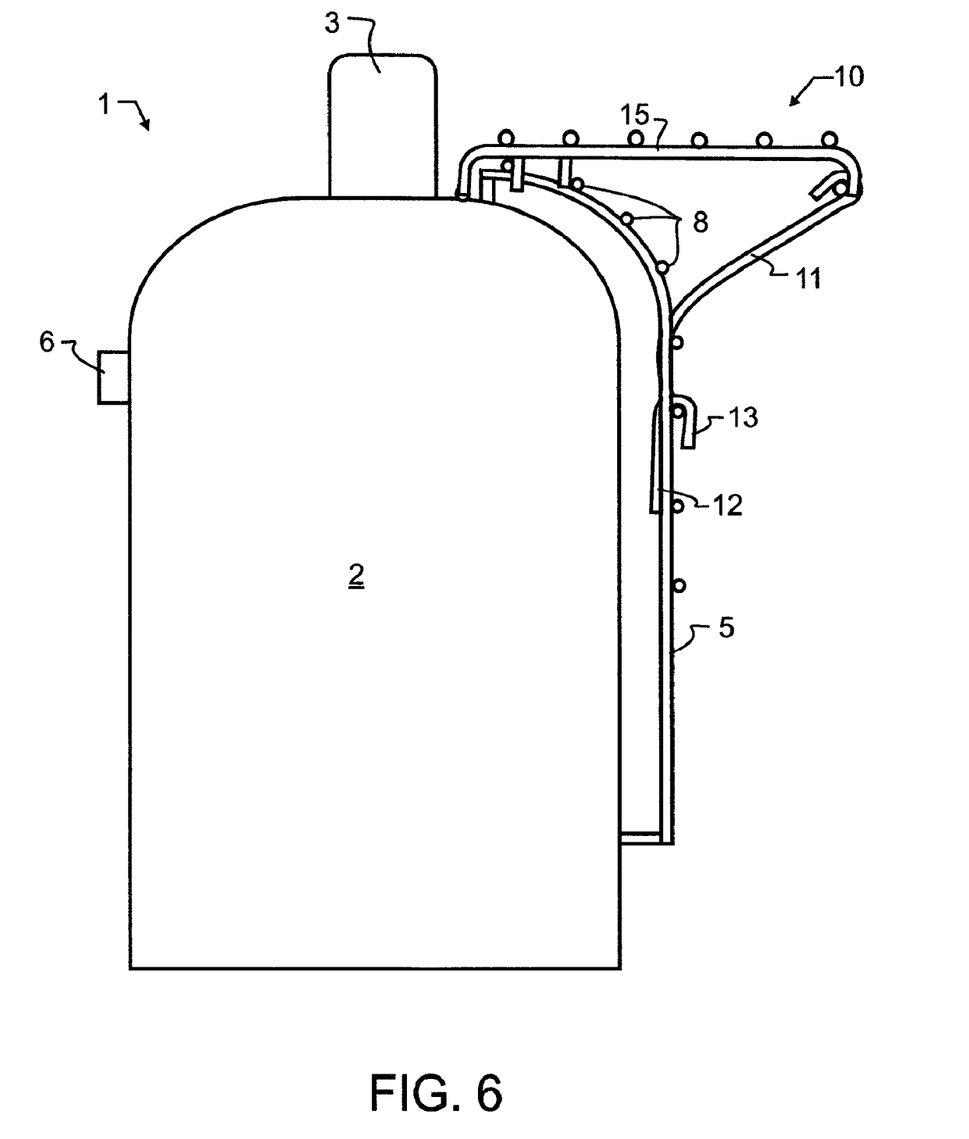
FIG. 6 illustrates the first preferred embodiment rack of FIGS. 4 and 5 in operative combination with the portable gas heater of FIGS. 1-3 from side plan view.
Figure 7:
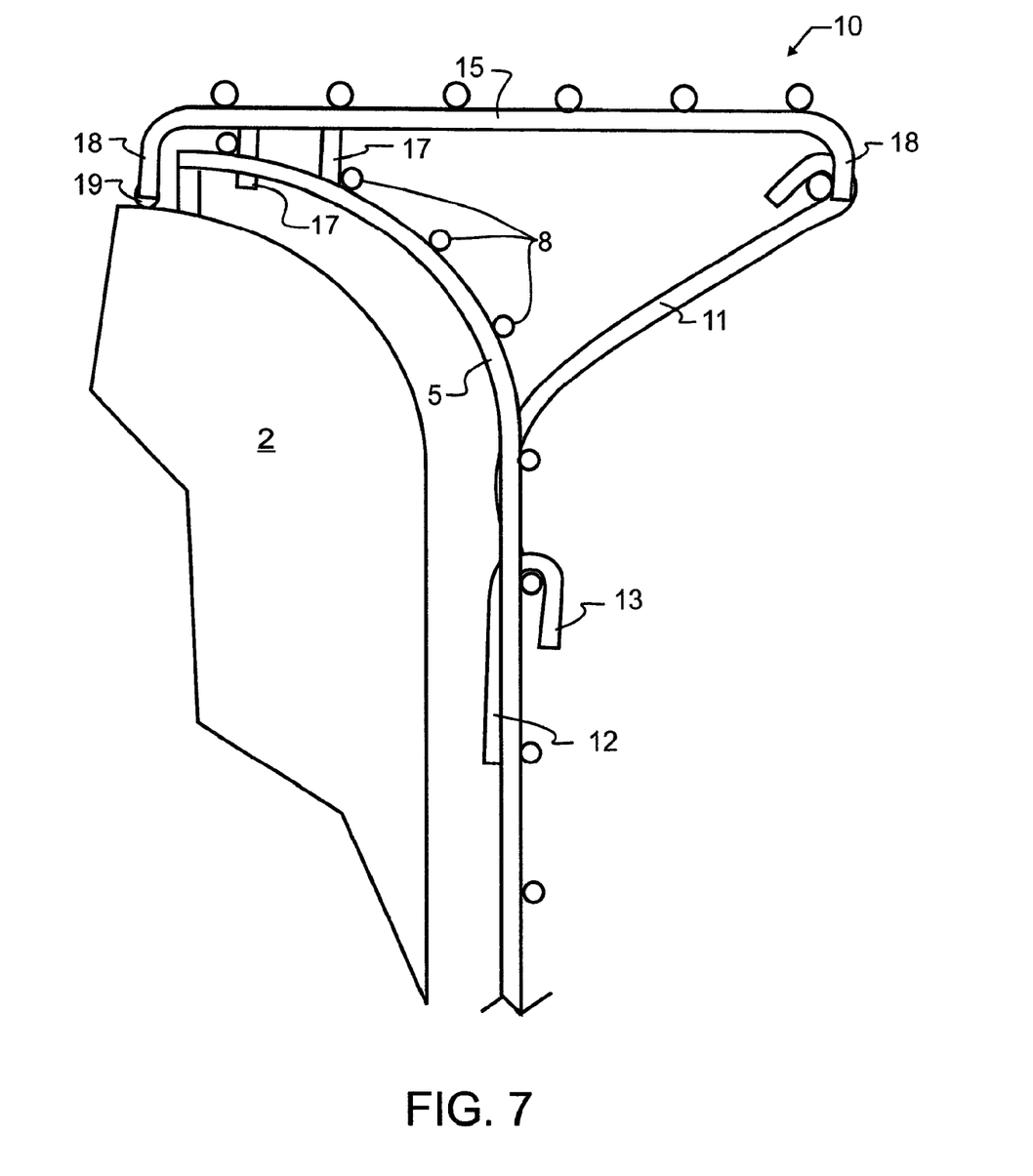
FIG. 7 illustrates the first preferred embodiment rack and protective grid of FIG. 6 by enlarged side view.

This engagement is illustrated in FIGS. 6 and 7, with legs 11 wrapping behind a crossbar of protective grid 5 and arcing away from heater 4 to enable the longer first bifurcation member 12 to connect with the side of protective grid 5 closest to heater 4 and the shorter second bifurcation member 13 to engage with the opposing side of protective grid 5. Such a design allows for relatively secure connection between legs 11 and protective grid 5. If force is applied to the preferred embodiment rack 10 towards heater 1, the shorter second bifurcation member 13 and the weaving of legs 11 into the protective grid will brace rack 10 against protective grid 5, preventing dislocation. Force applied away from heater 1 will be offset by the first, longer bifurcation member 12 and the weaving of legs 11 through protective grid 5. Upward force alone likewise cannot displace legs 11 due to the interlacing of legs 11 through protective grid 5, created by the arcing of legs 11. Furthermore, downward pressure only further secures the preferred embodiment rack 10 against protective grid 5, with more pressure being applied at the mating of bifurcated legs 11 and protective grid 5. Moreover, legs 11 fit within the confines of the vertical bars of protective grid 5, preventing warming rack 10 from sliding on the horizontal plane as well.

Figure 8:
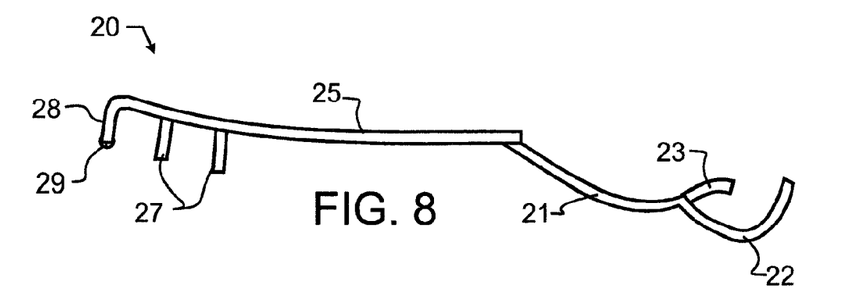
FIG. 8 illustrates an alternative embodiment rack designed in accord with the teachings of the present invention from view.
Figure 9:
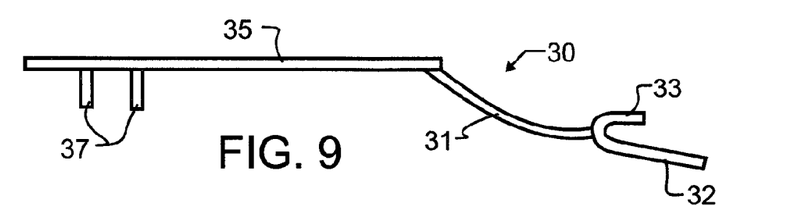
FIGS. 9 and 10 illustrate a second alternative embodiment rack designed in accord with the teachings of the present invention from side and top views, respectively.
Figure 10:
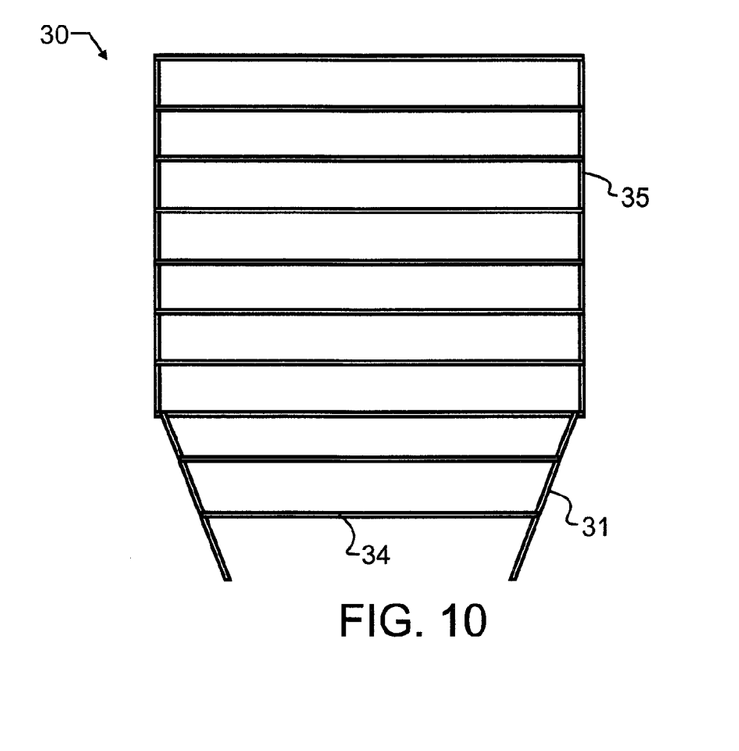

Alternatives to the preferred embodiment warming rack 10 are illustrated in FIGS. 8 and 9. The first preferred alternative embodiment warming rack 20 of FIG. 8 illustrates a slightly convex main support surface 25, providing an alternative support for heating individual food items, such as burritos, hot dogs, tacos, or any other variety of food. Additionally, first preferred alternative embodiment warming rack 20 illustrates a hooked longer bifurcation member 23 for more secure engagement with the protective grid 5. The trade-off, as may be apparent, is more difficult initial engagement of legs 21.

The second preferred alternative embodiment warming rack 30 of FIG. 9 is very similar to the preferred embodiment warming rack 10 of the present invention. The second preferred alternative embodiment warming rack 30 varies in that it does not have vertical extensions 18. Rather, the warming rack 30 of FIG. 9 engages with the heater 1 and the protective grid 5 solely using pins 37 to mate with protective grid 5.

Moreover, the second preferred alternative embodiment warming rack 30 has legs 31 which are pivotally attached to the cross-members 34 at a span equal to that of the cross-members 34, eliminating the need for stops 16. The preferred embodiment legs 31 angle inward as one gets more distal to main support surface 35, with the end result being a narrower span that enables legs 31 to mate with the protective grid 5 within the confines of the vertical bars of protective grid 5.

As may be apparent, a number of different embodiment racks have been illustrated herein. These illustrate the desired functional characteristics that are most preferred in the present invention. However, upon review, those skilled in the art will recognize that other geometries may be used to attain the same functional results. For exemplary purposes, the legs 11, 21, and 31 are illustrated as terminating in bifurcations 12, 13, 22, 23, and 32, 33. However, the bifurcation members 12, 22, and 32 could optionally be removed and the embodiments would still function. Since these bifurcation members provide stability when a rack is accidentally bumped or jostled, legs 11, 21, and 31 would preferably be redesigned to have a hairpin-type bend or other bends that would engage with and help prevent motion relative to protective grid 5, such as at the transition point where the legs pass through grid 5 or at other suitable location. Such alterations are considered to be incorporated herein, though somewhat less preferred.

Figure 11:
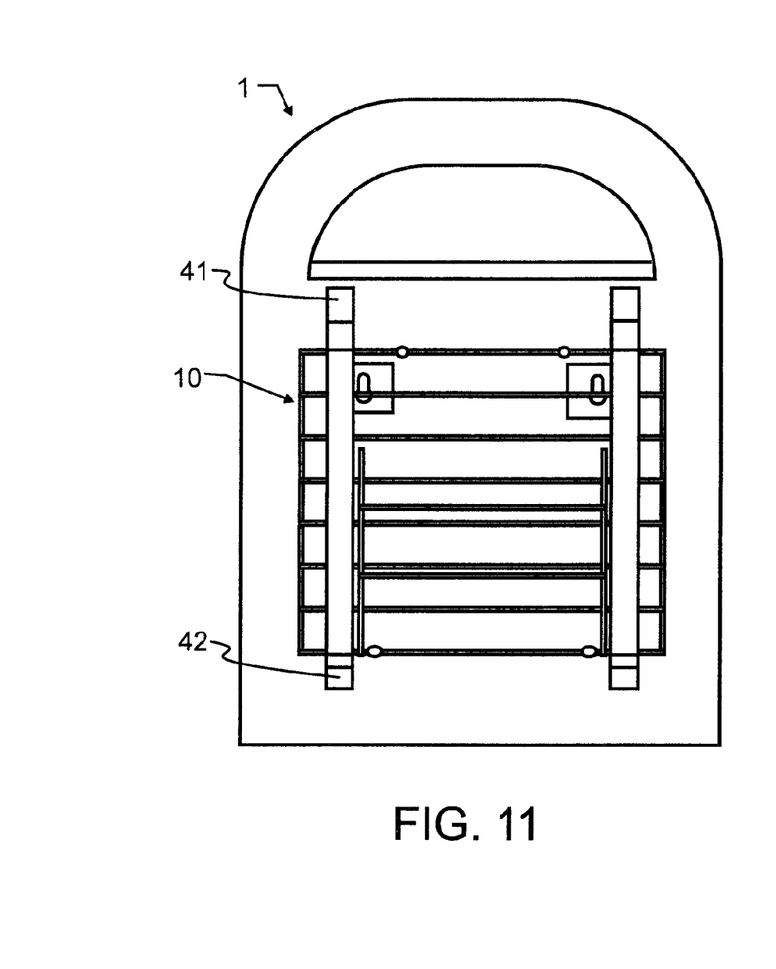
FIGS. 11 and 12 illustrate the first preferred embodiment rack of FIGS. 4 and 5 in stored combination with the portable gas heater of FIGS. 1-3 from side plan view.
Figure 12:
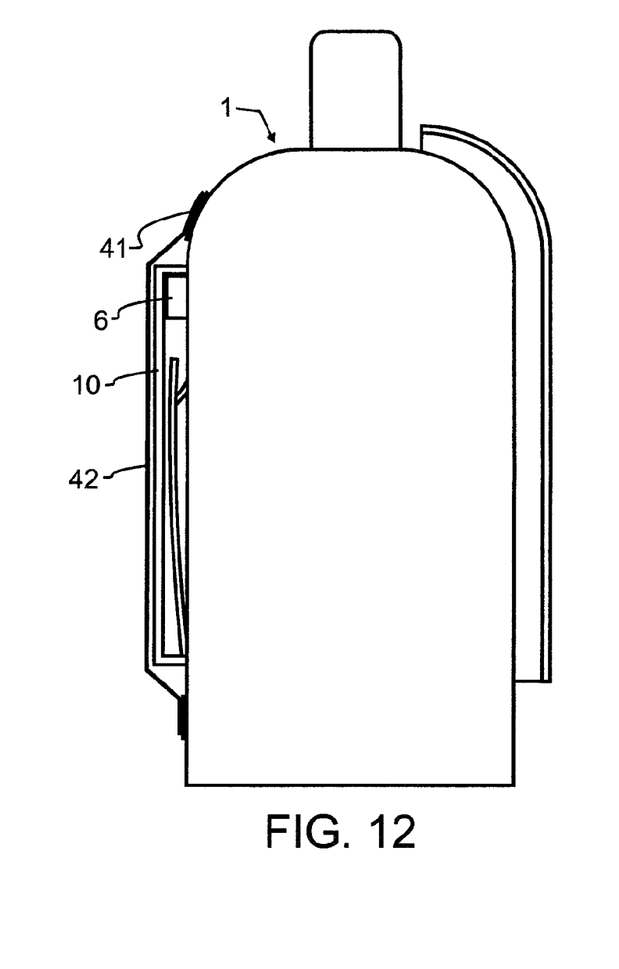

FIGS. 11 and 12 illustrate preferred embodiment rack 10 in a second stowed position in combination with portable space heater 1. As may be seen from the illustrations, rack 10 is preferably designed and dimensioned to hang from securing tabs 6, and is secured therewith using hook fastener 41 and strap 42 that has loops to engage with hook fastener 41. While a hook and loop fastening system is illustrated, it will be apparent that any other type of hardware may be utilized as known from the art of hardware, buckles and fasteners. In this stowed position, rack 10 fits either primarily or alternatively entirely within the outer profile of heater 1, which adjacent is defined by securing tabs 6. While as illustrated rack 10 is only primarily within the outer profile, the dimension of members 18 may be decreased and sufficient gap provided between wires on main support surface 15 to permit securing tabs 16 to pass through main support surface 15. This way, when stowed, securing tabs 6 would protrude farther than rack 10.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a portable space heater and a compact and collapsible rack, said combination heater and rack having a first operative position providing a support surface on said rack for warming and heating articles placed thereon, and a second stowed position for transport,
    said portable space heater comprising:
        a body,
        a heating element supported within said body, and
        a protective grid shielding said heating element from accidental contact, said protective grid defining a first surface and a second surface, said first surface relatively more adjacent to said heating element than said second surface and said second surface of said protective grid relatively more distal to said heating element than said first surface of said protective grid;
    said rack comprising:
        a main support surface;
        a leg assembly coupled with and moveable relative to said main support surface and having at least one leg member, said leg assembly in said second stowed position folded adjacent to said main support surface and in said first operative position extending generally perpendicular thereto;
    said rack in said first operative position coupled to said protective grid, said main support surface suspended and engaging with said protective grid, and said leg member at a transition location intermediate along said leg member passing through said protective grid and more distal from said main support surface than said transition location passing through said protective grid at least a second time.

2. The combination portable space heater and rack of claim 1, wherein said leg member further comprises a bifurcation on said leg member distal to said main support surface, said bifurcation also coupled to said protective grid and having a first bifurcation member extensive on said first surface of said protective grid and a second bifurcation member extensive on said second surface of said protective grid, said first and second bifurcations capturing said protective grid therebetween.

3. The combination portable space heater and rack of claim 1, wherein said leg assembly is coupled with and pivotal relative to said main support surface.

4. The combination portable space heater and rack of claim 2, wherein said bifurcation terminates said leg member distal to said main support surface.

5. The combination portable space heater and rack of claim 1, wherein in said first operative position said main support surface is suspended in a generally horizontal plane and engages with said protective grid.

6. The combination portable space heater and rack of claim 2, wherein said leg member bifurcations and said main support surface are held by gravity to said protective grid.

7. The combination portable space heater and rack of claim 2, wherein said first bifurcation member is longer than second bifurcation member, thereby facilitating insertion and capturing of said bifurcation about said protective grid, while providing greater resistance to separation therefrom.

8. The combination portable space heater and rack of claim 1, wherein said main support surface further comprises a plurality of pins protruding downward from said main support surface when said main support surface is in said first operative position, at least one of said plurality of pins operative to engage with said protective grid.

9. The combination portable space heater and rack of claim 1, wherein said rack further comprises wire.

10. The combination portable space heater and rack of claim 1, wherein said main support surface is vertically displaced from said space heater heating element.

11. The combination portable space heater and rack of claim 1, wherein said heater further comprises securing tabs protruding from said body, said rack in said second stowed position coupled to said securing tabs.

* * * * *